United States Patent

Kockel

[11] Patent Number: 5,599,049
[45] Date of Patent: Feb. 4, 1997

[54] LOCKING MEMBER

[75] Inventor: Wolfgang Kockel, Erkrath, Germany

[73] Assignee: Karl Hildebrand GmbH, Erkrath, Germany

[21] Appl. No.: 280,763

[22] Filed: Jul. 25, 1994

[30] Foreign Application Priority Data

Aug. 6, 1993 [DE] Germany .................. 9311767 U

[51] Int. Cl.$^6$ .................................................. E05C 19/10
[52] U.S. Cl. ........................................ 292/102; 292/336.3
[58] Field of Search .................................. 292/102, 194, 292/210, 95, DIG. 22, 130, 131, 336.3

[56] References Cited

U.S. PATENT DOCUMENTS

| | | | |
|---|---|---|---|
| 1,338,052 | 4/1920 | Voight | 292/131 X |
| 1,694,023 | 12/1928 | Suck | 292/131 X |
| 2,517,185 | 8/1950 | Elmer | 292/130 |
| 3,391,956 | 7/1968 | Rolfe, Jr. | 292/210 |
| 5,312,143 | 5/1994 | Buckner | 292/DIG. 22 X |

Primary Examiner—Steven N. Meyers
Assistant Examiner—Monica E. Millner
Attorney, Agent, or Firm—Keck, Mahin & Cate

[57] ABSTRACT

The invention relates to a locking member for the sides of commercial vehicles with a locking lever positioned in a hollow profile, in particular in a stanchion and which is pivotable with a locking hook and an articulation shaft about a pivoting axis. The locking hook engages in the locking position in an abutment of a side and can be pivoted with the aid of a control member engaging in the vicinity of the articulation shaft into an open position. In order to ensure a reliable locking and simultaneously a safe flapping down of a side subject to an internal pressure, the hollow profile and the articulation shaft of the locking hook are provided with engagement members constructed in complementary manner and which in the case of an internal pressure applied to the side pass from a pivoting position into an engagement position and block the opening movement of the locking lever.

9 Claims, 3 Drawing Sheets

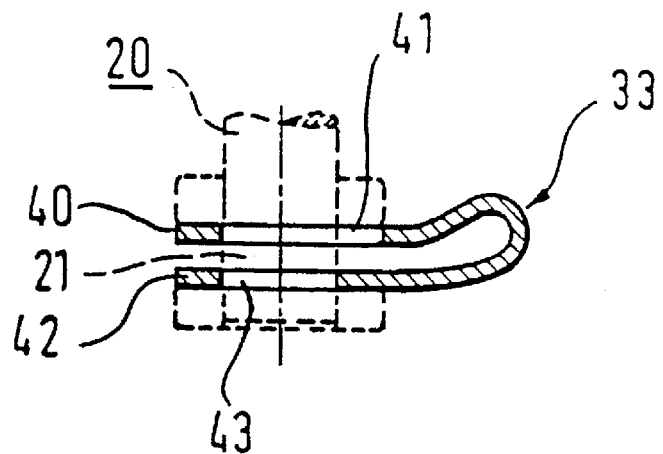
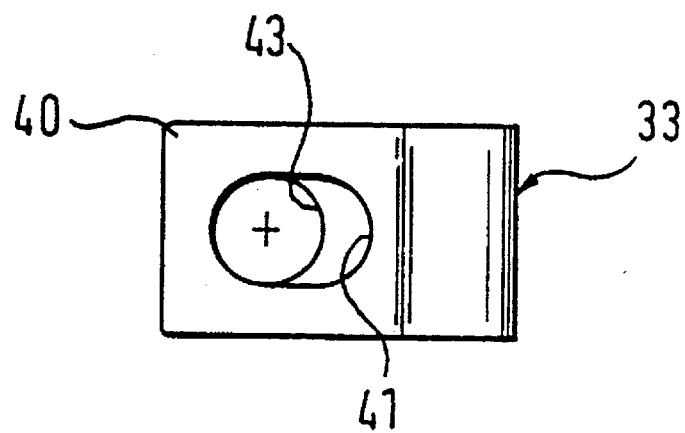

LOCKING MEMBER

BACKGROUND OF THE INVENTION

Such locking members generally have an integrally constructed locking lever with a bent locking hook which in the closed position engages behind an abutment, e.g. a ring. These locking members are used for locking sides of vehicles to stanchions. It is fundamentally possible to incorporate the locking lever in each hollow profile, e.g. in a vertical post or column and to lock the sides in the vertical position. If use is made hereinafter of the term stanchion, it is also intended to cover similar hollow profiles, hollow bodies or columns.

A disadvantage of the hitherto known lever-like locking members for vehicle sides is that it is not possible on unlocking to detect a possibly existing internal pressure, e.g. due to a shifted load and there is consequently a danger to operating personnel as a result of sides flapping down in uncontrolled manner or from the load dropping off.

SUMMARY OF THE INVENTION

The object of the invention is to provide a locking member with a vertically pivotable locking lever located in a stanchion and which in the case of a simple and robust construction ensures a reliable locking and in particular a safe flapping down of a vehicle side subject to an internal pressure.

The locking member according to the invention with a locking lever located in a hollow profile and in particular in a stanchion provides for a blocking of the pivoting movement of the locking lever on unlocking with the aid of engaging members. As the engaging members engage in a given, particularly a predeterminable or settable position, the opening pivoting movement of the locking lever is interrupted.

According to the invention the engaging members are constructed on an articulation shaft of the locking lever and in the vicinity of a base surface of a hollow profile or stanchion, which in the case of a pressure exerted on the inner face of a side in an engagement position inhibit the pivoting movement of the locking lever.

An engagement position is brought about by an internal pressure-loaded side, in which during the opening movement, i.e. on releasing a locking hook constructed on the locking lever from an abutment on the side, the internal pressure acts on the locking hook and leads to an inclined position of the locking lever. In the closed position and on opening the locking lever the latter moves parallel to the base surface of the stanchion.

In the case of an inclined position an articulation bolt with a free bolt end as the engagement member of the articulation shaft engages in an engagement opening. The engagement opening is constructed as a complementary engagement element in the vicinity of the stanchion base surface, preferably in a reception plate additionally fixed in the stanchion. The engagement opening has a diameter which is appropriately larger by a factor of 1.5 to 2.0 than the diameter of the free bolt end of the articulation bolt.

It is possible to provide the bolt shank of the articulation bolt in the engaging end region with a smaller or larger diameter. In a particularly advantageous construction a reliable engagement position is achieved by a spherical shaping of the end region of the bolt shank and by a complementary construction of the engagement opening in the reception plate.

To ensure that a blocking of the opening pivoting movement takes place with a clearly defined internal pressure, e.g. stipulated by standards, the articulation bolt is held in a pivoting position under pressure action, e.g. exerted by a spring tension.

In an appropriate construction a compression spring is supported on two guide rings in each case terminally fixed to the articulation bolt shank.

The compression spring can be a helical compression spring or a leaf spring, whose pressure acts in opposition to a predetermined load internal pressure.

According to a further development the pivoting position of the articulation bolt can be ensured with the aid of a pretensioned element, which acts on the articulation bolt in the vicinity of the engagement opening.

Importance is attached to an adjustable compressive force, which keeps the articulation bolt outside the engagement opening in a pivoting position and only in the case of a clearly defined internal pressure on the side leads to an inclined position of the locking lever, to a corresponding pressure on the compression spring and to the engagement of the bolt shank in the engagement opening.

The articulation bolt is positioned parallel to the pivoting axis of the locking lever. Preferably the pivoting axis is constituted by a shaft in the stanchion, about which the locking lever is pivotably guided with clearance.

The opening and closing position is appropriately initiated by a control member engaging in the vicinity of the articulation shaft. For example, it is possible to remove a hand lever in the stanchion in the vertical direction in order to achieve a pivoting movement of the locking lever about the horizontally positioned pivoting axis. In order to damp the locking movement and to avoid contamination, plastic elements are provided in the vicinity of the shaft of the pivoting axis. A plastic ring is provided on the shaft circumference for sealing a hollow profile opening through which extends the locking hook with a bent end.

BRIEF DESCRIPTION OF THE DRAWINGS

The invention is described in greater detail hereinafter relative to the drawings, wherein show in highly diagrammatic manner:

FIG. 3 a horizontal cross-section through a leaf spring, which is to be alternatively used in a locking member according to FIG. 1.

FIG. 4 a view of a leaf spring according to arrow B in FIG. B.

DESCRIPTION OF THE PREFERRED EMBODIMENTS

Figure 1:
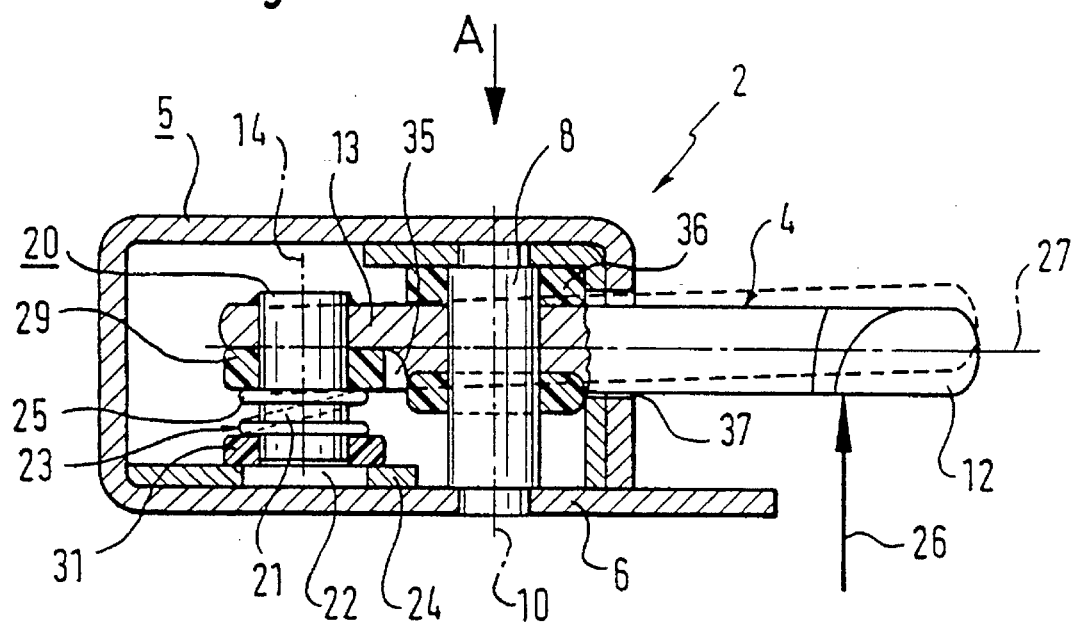
FIG. 1 a horizontal cross-section through a locking member, whose locking lever is fixed in a stanchion.

In highly diagrammatic manner FIG. 1 shows a locking member 2 with a locking lever 4, which is fixed in a hollow profile 5, e.g. in a vertically positioned stanchion, with a pivoting axis 10 along which a shaft 8 extends.

Figure 2:
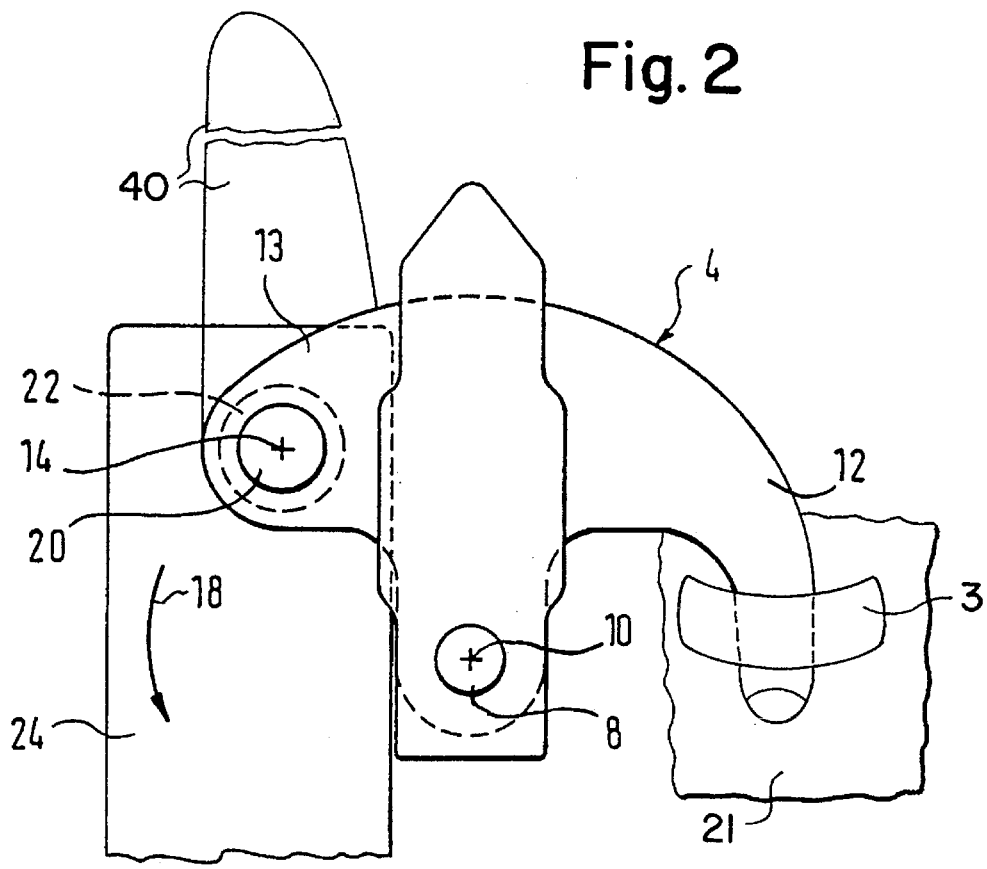
FIG. 2 a view of a locking member in accordance with arrow A in FIG. 1 without a stanchion.

The locking lever 4 is vertically pivotable with the pivoting axis 10 arranged horizontally between a locking hook 12 and an articulation area 13 with articulation axis 14 according to arrow 18, the locking hook 12 engaging in a closed position behind an abutment 3, e.g. a partial ring, of a 21 as shown in FIG. 2 vehicle side.

With the aid of a control element 40 as shown in FIG. 2 acting in the vicinity of the articulation area 13 and which can e.g. be detachably connected, a pivoting of the locking lever 4 according to the arrow 18 (cf. FIG. 2) and an unlocking of a side in the vicinity of a locking member is brought about.

In order to substantially avoid any injury risk as a result of the flapping down of a side in the case of pressure exerted on the inner face thereof by a load, in the vicinity of the hollow profile 5 and in the articulation area 13 are provided cooperating engagement members 20 and 22 which, in the case of an internal pressure, pass into an engagement position blocking the further opening of the locking lever.

Figure 5:
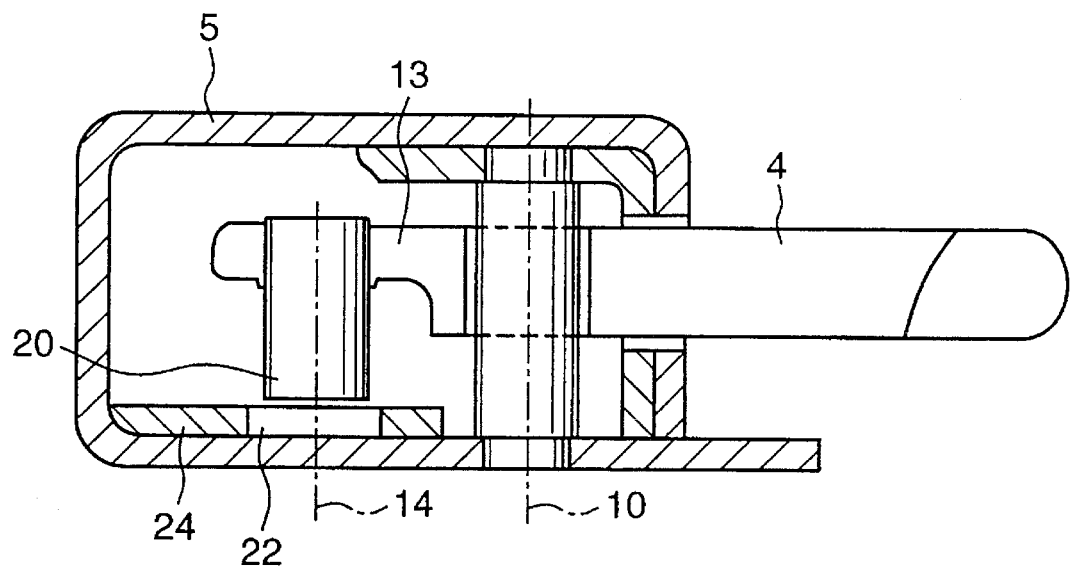
FIG. 5 a schematic, with elements deleted for reasons of clarity, showing how the remaining elements interact in a pivoting position.
Figure 6:
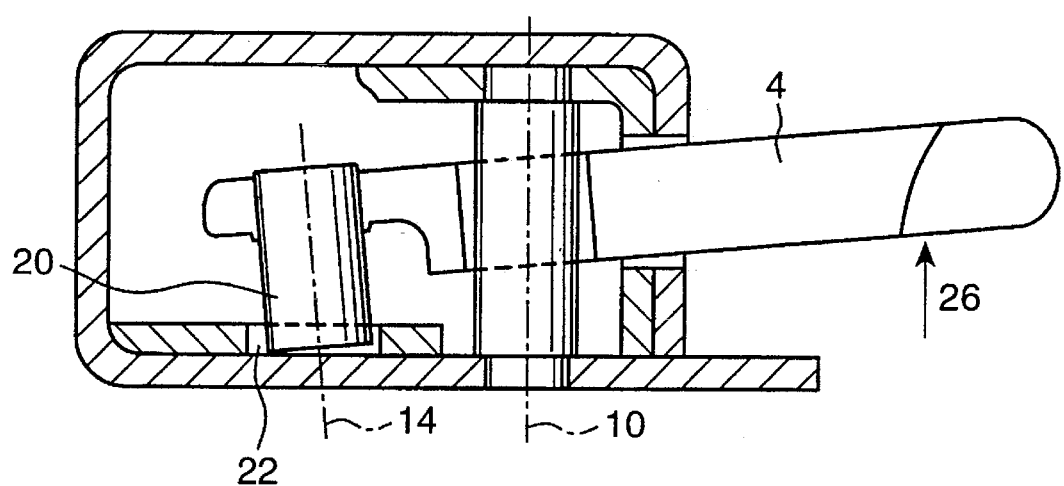
FIG. 6 a schematic, with elements deleted for reasons of clarity, showing how the remaining elements interact in an engagement position.

As noted previously, FIG. 5 is a schematic illustration of the locking member shown in FIG. 1, with certain elements deleted for reasons of clarity, showing how the remaining elements interact when the locking member is in a pivoting position. FIG. 6 is a schematic illustration similar to FIG. 5 but showing how the remaining elements interact when the locking member is in an engagement position.

The engagement member 20 is an articulation bolt on the articulation axis 14 and the engagement member 22 of the hollow profile 5 is an engagement opening in a reception plate 24 fixed by welding, for example, to the basic surface 6 of the hollow profile 5.

The engagement opening 22 is circular and has a diameter, which is larger by a factor of 1.5 to 2.0 than the diameter of the engaging bolt end of the articulation bolt 20. The reception plate 24 is almost 1.5 mm thick, so that the engaging end of the articulation bolt 20 is held in a secure engagement position. If in the case of an internal pressure a side acts on a partly released locking hook 12, as indicated by the arrow 26 in FIG. 1, the locking lever 4 is moved into an inclined position, relative to its longitudinal axis 27 parallel to the stanchion, so that the articulation bolt 20 is forced into the engagement opening 22 as shown in FIG. 6. It is no longer possible to pivot the locking lever 4 in this engagement position. Only following the elimination of the internal pressure applied and with a virtually perpendicular side is it possible for the locking lever 4, which is once again in a pivoting position parallel to the hollow profile 5 as shown in FIG. 5, to be moved.

It is particularly advantageous to have a compression spring 23, particularly a helical compression spring 25, which keeps the articulation bolt 20 in the pivoting position up to a defined, adjustable pressure, e.g. up to 22 kp and in the case of an internal pressure of e.g. 22 to 25 kp exerted on the side ensures an engagement of the articulation bolt 20 in the engagement opening 22.

The helical compression spring 25 is preferably detachably held in the vicinity of the articulated bolt 20, so as to permit an uncomplicated replacement and optionally a change to the compression spring range.

FIG. 2 is a detailed view of of the locking lever 4 with the pivoting axis 10, the indicated locking hook 12, the articulation area 13 and the articulation axis 14, together with the reception plate 24 with engagement opening 22.

The locking lever 4 is placed with clearance on the shaft 8 extending along the pivoting axis 10, in order to permit an inclined engagement position indicated by broken lines in FIG. 1. In this embodiment the inclined engagement position is roughly 3 to 4°, based on a longitudinal axis 27 of the locking lever 4 running parallel to the hollow profile 5.

The helical compression spring 25 according to FIG. 1 is supported on a locking lever-side guide ring 29 or the articulation from the lever part and on a guide ring 31 located on the reception plate 24. These guide rings 29,31 are approximately 2.5 mm thick, the locking lever-side guide ring 29 being preferably located in a recess 35 of the articulation area 13. Advantageously the guide rings 29,31 are made from a compressively loadable plastics material. A sealing element 36 on the shaft, which in the vicinity of a hollow profile opening 37 prevents any dirtying of the hollow profile, is also made from a plastics material.

FIGS. 3 and 4 show a further possible spring construction. A hair-pin-shaped leaf spring 33 has a locking lever-side spring leg 40 and a hollow profile-side spring leg 42. For an almost central guidance of the parallel and inclined shank 21 of the articulation bolt 20 is formed in the locking lever-side spring leg 40 an elongated opening 41 and in the hollow profile-side spring leg 42 a circular opening 43. An opening of the locking member and a safe flapping down of a side locked to a hollow profile and in particular a stanchion is only possible if no internal pressure is exerted on the side and the articulation bolt is moved from an engagement position into a pivoting position.

I claim:

1. A locking member in combination with vehicle sides and locking said vehicle sides, said locking member comprising:

a hollow stanchion;

a locking lever mounted on said stanchion and having a locking hook and an articulation area, the locking hook engaging, in a locking position, behind an abutment on a vehicle side and pivotable into an open position by a control element engaging in the articulation area of the locking lever;

a shaft, mounted in said stanchion, extending along a pivoting axis, the locking lever being pivotably guided, with clearance, about the shaft extending along the pivoting axis; and engagement means provided on the stanchion and the articulation area for blocking an opening movement of the locking lever when said locking lever is moved from a pivoting position into an engagement position, the engagement means including an articulation bolt, fixed on the articulation area of the locking lever, having an articulation axis parallel to the pivoting axis when said locking lever is in the pivoting position and an engagement opening defined in a reception element mounted on a surface of the hollow stanchion, a free end of the articulation bolt engaging the engagement opening when pressure applied to the locking lever moves the locking lever into said engagement position.

2. A locking member according to claim 1, wherein the reception element is a reception plate fixed to the surface of the hollow stanchion.

3. A locking member according to claim 2, wherein the locking lever is biased into the pivoting position and the free end of the articulation bolt engages the engagement opening when a predetermined pressure is applied to the locking hook.

4. A locking member according to claim 3, and further comprising a compression spring placed around a shank of said articulation bolt, a first, lever-side, guide ring, and a second guide ring on the reception plate, said first and second guide rings supporting ends of said compression spring.

5. A locking member according to claim 4, wherein said compression spring is a helical compression spring.

6. A locking member according to claim 4, wherein the compression spring is a bent leaf spring having a locking lever-side spring leg and a hollow stanchion-side spring leg, the hollow stanchion-side spring leg being provided with a circular opening and the locking lever-side spring leg being provided with an elongated opening for guiding the bolt shank.

7. A locking member according to claim 1, wherein the pivoting axis is arranged horizontally and the locking lever is vertically pivotable about the shaft extending along the pivoting axis.

8. A locking member according to claim 7, wherein the engagement position of the locking lever is inclined up to approximately 4° relative to the pivoting position.

9. A locking member according to claim 1, and further comprising a sealing element adjacent to a hollow stanchion opening through which the locking hook extends.

* * * * *